United States Patent
Chaurasia et al.

(10) Patent No.: US 12,169,936 B2
(45) Date of Patent: Dec. 17, 2024

(54) SEMI SUPERVISED TRAINING FROM COARSE LABELS OF IMAGE SEGMENTATION

(71) Applicant: Micron Technology, Inc., Boise, ID (US)

(72) Inventors: Abhishek Chaurasia, Bellevue, WA (US); Katya B. Giannios, West Lafayette, IN (US)

(73) Assignee: Micron Technology, Inc., Boise, ID (US)

( * ) Notice: Subject to any disclaimer, the term of this patent is extended or adjusted under 35 U.S.C. 154(b) by 365 days.

(21) Appl. No.: 17/727,604

(22) Filed: Apr. 22, 2022

(65) Prior Publication Data

US 2022/0358658 A1  Nov. 10, 2022

Related U.S. Application Data

(60) Provisional application No. 63/185,278, filed on May 6, 2021.

(51) Int. Cl.
*G06T 7/10* (2017.01)
*G06N 3/045* (2023.01)

(52) U.S. Cl.
CPC ............ *G06T 7/10* (2017.01); *G06N 3/045* (2023.01); *G06T 2200/24* (2013.01); *G06T 2207/20081* (2013.01); *G06T 2207/20084* (2013.01)

(58) Field of Classification Search
CPC ............... G06T 7/10; G06T 2200/24; G06T 2207/20081; G06T 2207/20084; G06N 3/045
See application file for complete search history.

(56) References Cited

U.S. PATENT DOCUMENTS

| | | | |
|---|---|---|---|
| 2019/0205748 A1* | 7/2019 | Fukuda | G06N 3/044 |
| 2019/0378006 A1* | 12/2019 | Fukuda | G06N 3/08 |
| 2022/0350968 A1* | 11/2022 | Rossi | G06F 40/30 |

(Continued)

OTHER PUBLICATIONS

Sun, Liyan, et al. "A teacher-student framework for semi-supervised medical image segmentation from mixed supervision." arXiv preprint arXiv:2010.12219 (2020). (Year: 2020).*

(Continued)

*Primary Examiner* — Utpal D Shah
(74) *Attorney, Agent, or Firm* — Greenberg Traurig

(57) ABSTRACT

A system, method and apparatus of image segmentation with semi supervised training of an artificial neural network using coarse labels. For example, a first artificial neural network is trained to perform image segmentation on first images according to fine labels of image segmentation for the first images and to perform image segmentation on second images according to coarse labels of image segmentation for the second images. After the training, the first artificial neural network is used to perform image segmentation of the second images to identify improved labels of image segmentation for the second images. Subsequently, a supervised machine learning technique can be used to train a second artificial neural network to perform image segmentation on the first images according to fine labels and on the second images according to the improved labels.

20 Claims, 6 Drawing Sheets

(56) References Cited

U.S. PATENT DOCUMENTS

2022/0398832 A1* 12/2022 Moliner ................ G06N 3/045

OTHER PUBLICATIONS

Liang-Chieh Chen, Raphael Gontijo Lopes, Bowen Cheng, Maxwell D. Collins, Ekin D. Cubuk, Barret Zoph, Hartwig Adam, Jonathon Shlens, "Naive-Student: Leveraging Semi-Supervised Learning in Video Sequences for Urban Scene Segmentation", arXiv:2005.10266v4 [cs.CV] Jul. 20, 2020.

Qizhu Li, Anurag Arnab, Philip H.S. Torr, "Weakly- and Semi-Supervised Panoptic Segmentation", arXiv:1808.03575v3 [cs.CV] Jan. 13, 2019.

* cited by examiner

SEMI SUPERVISED TRAINING FROM COARSE LABELS OF IMAGE SEGMENTATION

RELATED APPLICATIONS

The present application claims priority to Prov. U.S. Pat. App. Ser. No. 63/185,278 filed May 6, 2021, the entire disclosures of which application are hereby incorporated herein by reference.

TECHNICAL FIELD

At least some embodiments disclosed herein relate to image segmentation in general, and more particularly, but not limited to semi supervised training of an Artificial Neural Network (ANN) for image segmentation.

BACKGROUND

An Artificial Neural Network (ANN) uses a network of neurons to process inputs to the network and to generate outputs from the network.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to semi supervised training of an artificial neural network in performing image segmentation using coarse labels.

An image of a scene has an array of pixels depicting different objects in the scene. The array of pixels can be separated into groups, each representing an item of interest. In an operation of semantic segmentation, an item of interest is one or more instances of a class of objects, such person, vehicle, road, building, etc. In an operation of instance segmentation, an item of interest is one instance of a class of objects. Panoptic segmentation identifies both semantic items, each depicting a class of one or more object instances, and instance items, each depicting a single object instance in a class. During the operation of image segmentation, each pixel in the image can be classified according to class and/or classified according to instance.

When a supervised machine learning technique is used to train an artificial neural network to perform image segmentation, it is typical for a human operator to provide labels on training images to teach the artificial neural network. A label identifies a desirable result of image segmentation as performed by the human operator; and the parameters of the artificial neural network can be adjusted using the supervised machine learning technique to best match its image segmentation results with the labels identified by human operators. It can require a significant amount of efforts and resources to create the labels by human operators to implement supervised training of an artificial neural network based on a large number of images (e.g., video images).

At least some aspects of the present disclosure address the above and other deficiencies and/or challenges by semi supervised training using coarse labels. A coarse label identifies an approximate boundary of an image segment in an image. In contrast, a fine label provides the exact boundary of the image segment as identified by a human operator. A coarse label can provide a useful clue with a degree of inaccuracy near the boundary of the image segment. Since the coarse label is less expensive to generate than a corresponding fine label, the use of the coarse label and semi supervised training can reduce the efforts and resources involved in the training of the artificial neural network, while making best use of a large number of training images.

Figure 1:
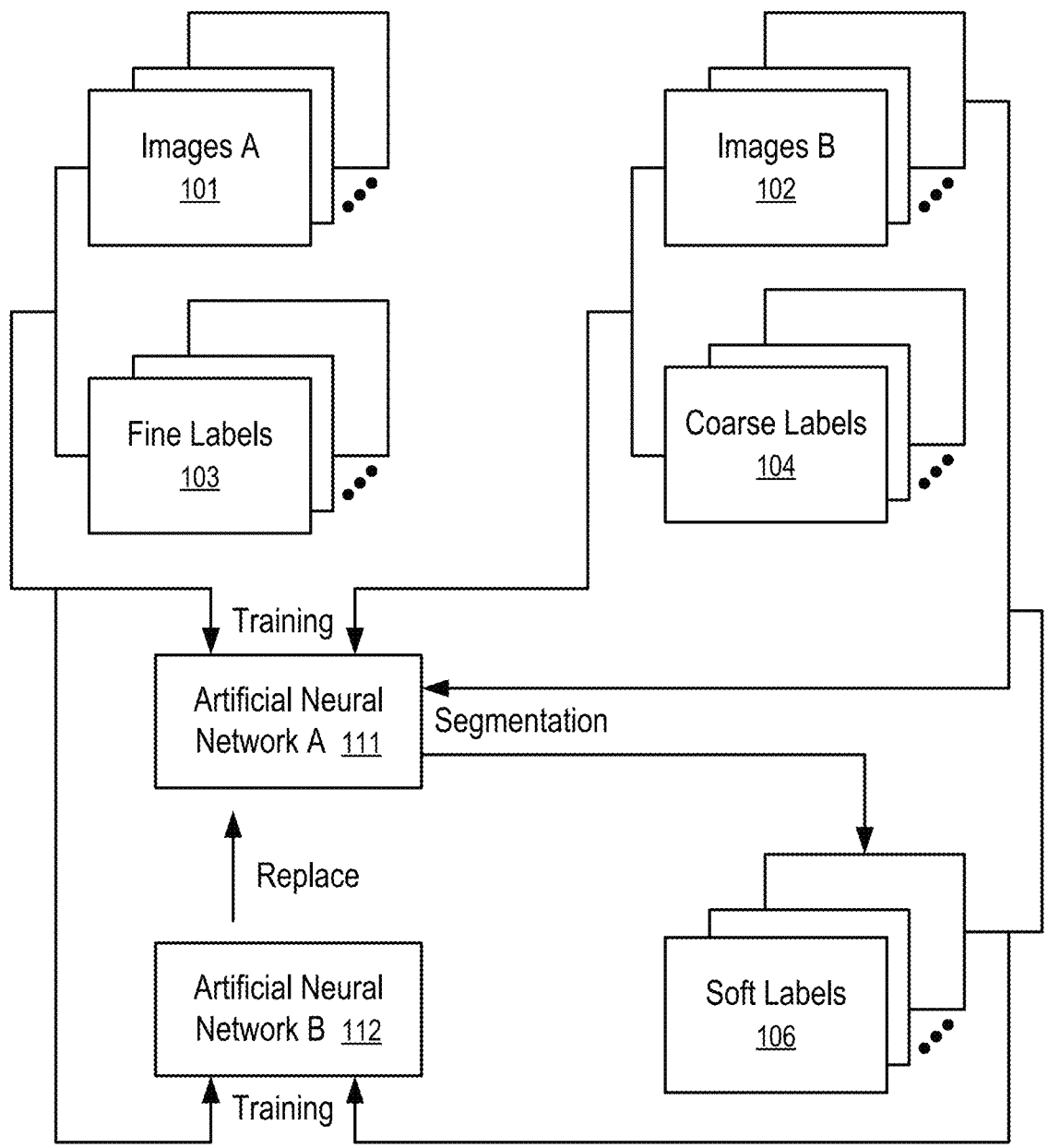
FIGS. 1-3 show techniques of semi supervised training of an Artificial Neural Network (ANN) to perform image segmentation using at least in part coarse labels according to some embodiments.
Figure 2:
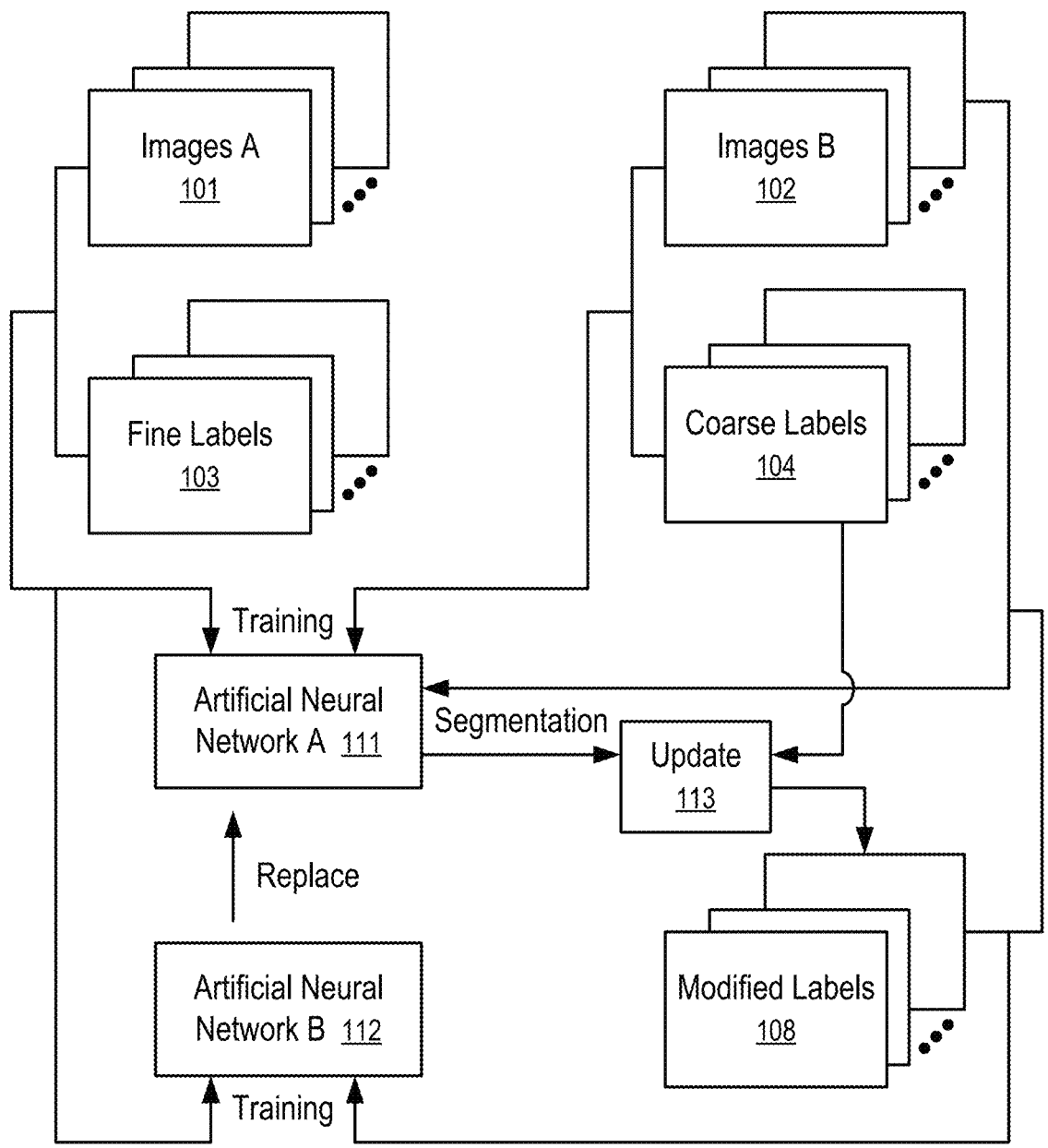
Figure 3:
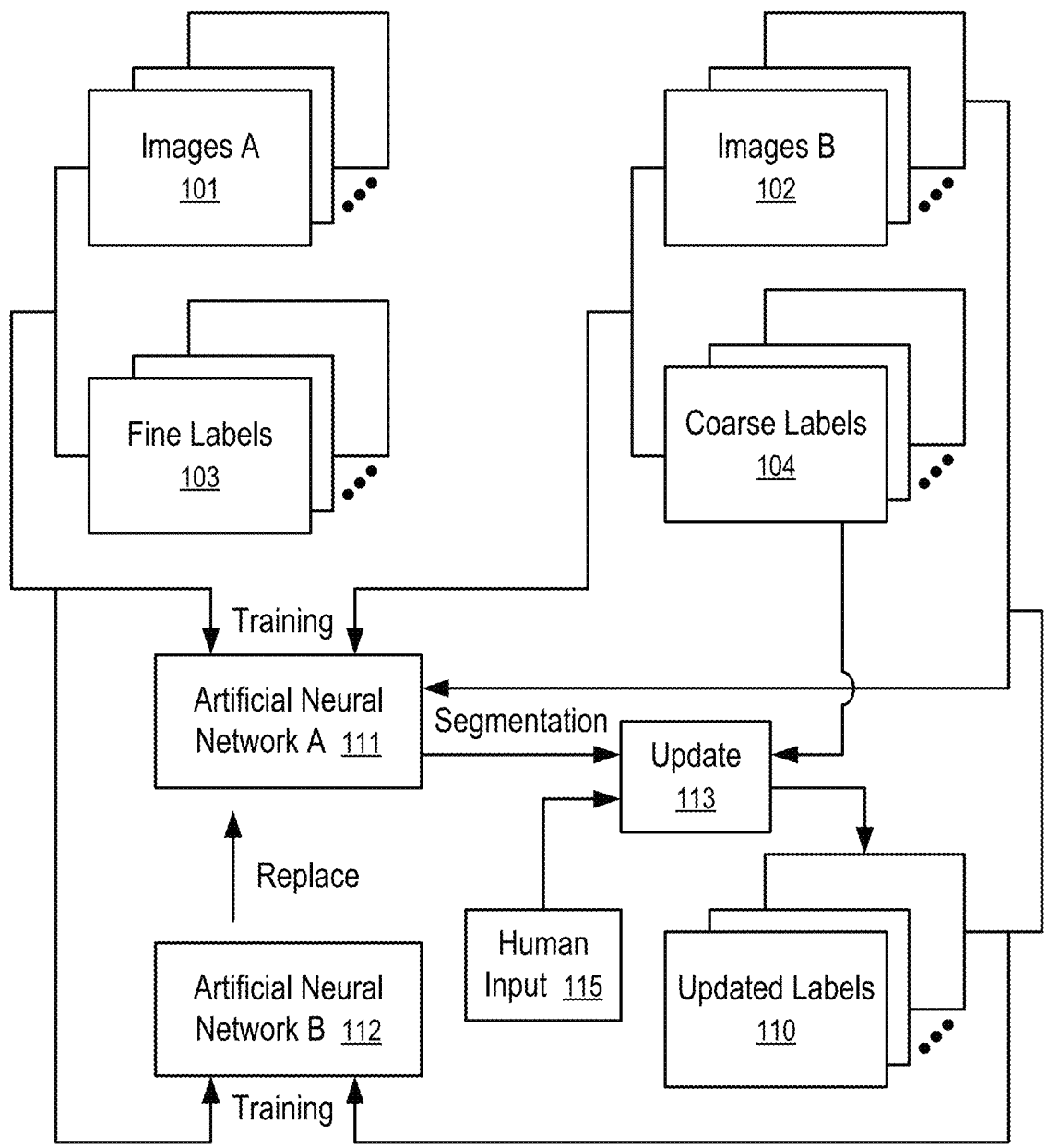

FIGS. 1-3 show techniques of semi supervised training of an Artificial Neural Network (ANN) to perform image segmentation using at least in part coarse labels according to some embodiments.

In FIGS. 1-3, training images A 101 and images B 102 are available for the training of an artificial neural network 111 to perform image segmentation.

Fine labels 103 are provided for the images A 101; and the coarse labels 104 are provided for the images B 102 to reduce efforts and resources involved in the generation of labels.

Figure 4:
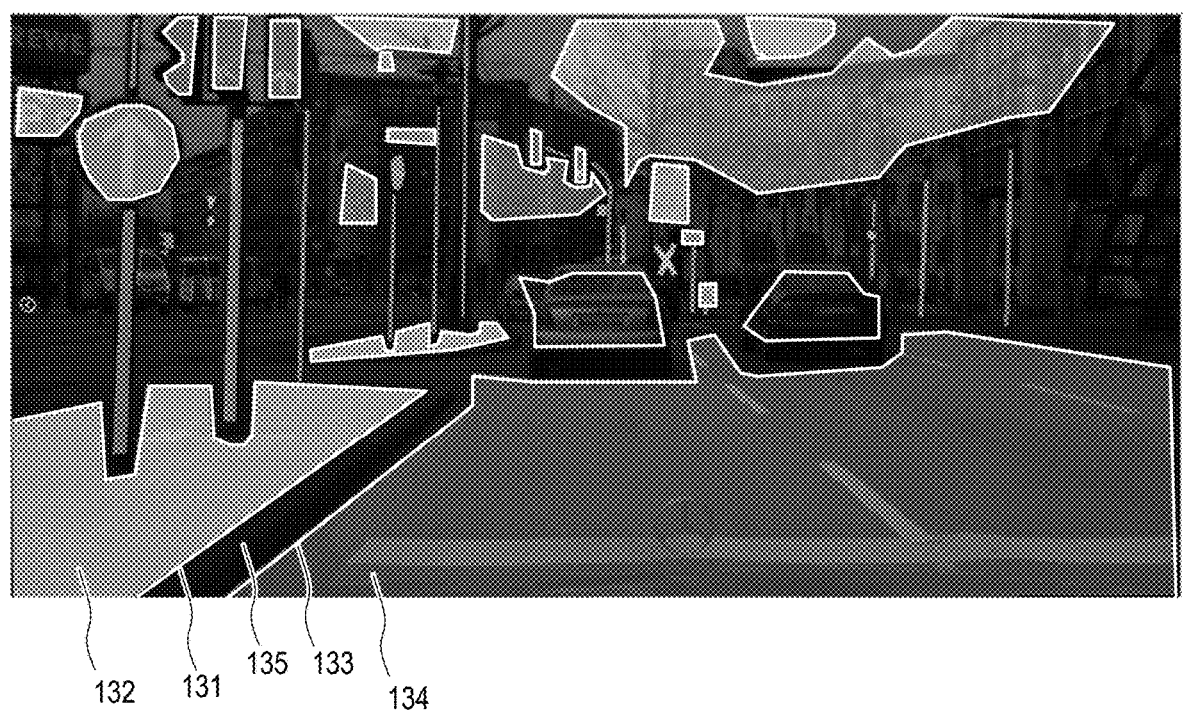
FIG. 4 illustrates an example of coarse labels for semi supervised training in image segmentation according to one embodiment.

FIG. 4 illustrates an example of coarse labels for semi supervised training in image segmentation according to one embodiment.

In FIG. 4, an image segment 134 is identified to have an approximate boundary 133; and another image segment 132 is identified to have an approximate boundary 131. The pixels of the image segments (e.g., 132 and 134) are labeled to identify their attributes (e.g., class and/or instance). Some of the pixels, e.g., in area 135, are not labeled. The coarse labels provided for the image illustrated in FIG. 4 are less accurate for pixels near the boundaries 131 and 133 and more accurate for pixels in the interior of the image segments 132 and 134. Thus, the coarse labels provide approximate classifications of the individual pixels in image segmentation, with varying degrees of confidence levels for the pixels in the images in view of their distances to the boundaries to other segments and their distances to the center or interior of their respective segments.

The coarse labels 104 for the images 102 can be useful in training the artificial neural network 111 to improve its image segmentation capability.

In FIGS. 1-3, the images 101 and 102 and their labels 103 and 104 are used to train the artificial neural network 111 using a supervised machine learning technique. The training is configured to reduce the differences between the image segments identified by the artificial neural network 111 and the image segments identified by the labels 103 and 104.

For example, the supervised machine learning technique can be configured to minimize a loss function that includes the cross entropy loss relative to the labels 103 and 104 for image segmentation.

The coarse labels 104 are less accurate for some labeled pixels than other labeled pixels. The loss function evaluated based on the coarse labels can be constructed in a way that is weighted according to the accuracy estimation for the labeling of pixels by the coarse labels. For example, pixels with less accurate labeling near the boundaries of image segments identified by the coarse labels can have smaller weights in the cost function than pixels with more accurate labeling.

After the artificial neural network 111 is trained on the images 101 and 102 according to the fine labels 103 and coarse labels 104, the artificial neural network 111 can be used to perform image segmentation on the images 102 that have coarse labels 104. The image segmentation operation performed by the artificial neural network 111 as a teacher generates soft labels 106 for the images 102. The soft labels 106 can be used to teach or train an artificial neural network 112 as a student.

For example, in FIG. 1, the student artificial neural network 112 is trained on the images 101 with the fine labels 103 and the images 102 with the soft labels 106. Since the soft labels 106 are generated with the help of the fine labels 103 used to train the teacher artificial neural network 111, the soft labels 106 are generally more accurate than the coarse labels 104. Further, the soft labels 106 include classifications of pixels in the images 102 that are not classified in the coarse labels 104. Thus, after the training on the images 101 and 102 according to the fine labels 103 and the soft labels, the student artificial neural network 112 can outperform the teacher artificial neural network 112; and subsequently, the student artificial neural network 112 can replace the teacher artificial neural network 111 in the next iteration of training a further student artificial neural network.

For example, the supervised machine learning technique can be configured to minimize a loss function that includes the cross entropy loss relative to the fine labels 103 and the soft labels 104 for image segmentation. For example, in evaluating the loss function, the supervised machine learning technique can be configured to use Wasserstein distance (also known as Wasserstein metric, or Kantorovich-Rubinstein metric) for the regions of pixels that have labels/classifications updated from the coarse labels 104 to the soft labels 106.

In FIG. 2, the image segmentation results of the teacher artificial neural network 111 is used to selectively update 113 of the coarse labels 104 to generate modified labels.

For example, the confidence level of the classification result of a pixel in the images 102 can be evaluated by the teacher artificial neural network 111 during the image segmentation operation. When the confidence level is above a threshold, the classification result of the pixel identified by the teacher artificial neural network can be used to update the corresponding classification in the coarse labels 104 to generate the modified labels 108 for the images 102.

For example, the confidence level of the classification result of a pixel in the images 102 identified by the teacher artificial neural network 111 can be compared to the estimated confidence level of the classification result of the corresponding pixel in the coarse labels 104. When the classification result of the teacher artificial neural network 111 has a better confidence level than the coarse labels 104, the classification result of the pixel identified by the teacher artificial neural network 111 can be used to update the corresponding classification in the coarse labels 104 to generate the modified labels 108. For example, the output of the teacher artificial neural network 111 can include the probability of each pixel being classified in each class. The higher the probability of a pixel being classified in a class, the higher is the confidence level of the classification result of the pixel being in the class. The threshold for accepting that a pixel being in a class can be a predetermined probability threshold above 0.5, or a predetermined probability increment (e.g., 0.1) more than the class having the next highest probability. When the teacher artificial neural network 111 has high confidence for images 102, especially for the unlabeled regions, new modified labels 108 can be generated. Optionally, regions with coarse labels 104 can also be updated to generate the modified labels 108 when the output of the teacher artificial neural network 111 meets a threshold requirement higher than the requirement for accepting the labels/classifications for the previously unlabeled regions.

Similar to the training of the student artificial neural network 112 in FIG. 1, the student artificial neural network 112 in FIG. 2 can be trained on the images 101 and 102 according to the fine labels 103 and the modified labels 108. The trained student artificial neural network 112 can be promoted as a teacher in a next iteration to train a further student artificial neural network.

In FIG. 3, human inputs 115 can be provided to update 113 the coarse labels 104 using the segmentation results of the teacher artificial neural network 111.

For example, a graphical user interface can be used to present the classification results having low confidence levels such that a human operator can provide assistance in labeling the difficult scenarios.

For example, the graphical user interface can present the image segmentation results for the images 102 for review by a human operator. The human operator can visually examine the results to promote/approve some of the soft labels 106 identified by the teacher artificial neural network 112 as fine labels 103. Thus, the update 113 can include reclassifying some of the images 102 as having fine labels that are identified at least in part with the assistance of the teacher artificial neural network 111 and that have the confirmation/approval from a human operator.

Based on the segmentation results generated by the artificial neural network 111 for the images and the human input 115, the update 113 can be performed to generate the updated labels 110 to train the student artificial neural network 112.

For example, the images 101 and 102 can be from a same video clip. Thus, the similarity between the scenes in the images 101 and 102 can be high. A small numbers of images 101 can be selected from the video clip for annotation by a human operator to generate the fine labels 103. The coarse labels 104 can be generated by a human operator, and/or by a software tool (e.g., based on video object tracking, bounding boxes). Through the semi supervised training iteration of teaching a student artificial neural network 112 using a teacher artificial neural network 112, the coarse labels 104 can be improved and accepted, with occasional help from the human input 115. Thus, the resulting artificial neural network 111 and/or 112 can have a performance level matching an artificial neural network training on the images 101 and 102 that both have fine labels. However, the semi supervised training technique can drastically reduce the efforts and resources in generating the labels for the training.

In another example, the images 101 and fine labels 103 are from a library and/or from video clips not related to the video clips of the images 102. The train an artificial neural network to segment images 102 from the new video clip, coarse labels 104 are generated (e.g., as bounding boxes, or quick drawing of boundaries of images of items of interest). The semi supervised training techniques of FIGS. 1-3 can be used to develop fine labels for the images 102 and train the artificial neural network on the images 102 at the same time, with less human efforts in labeling the images 102.

Figure 5:
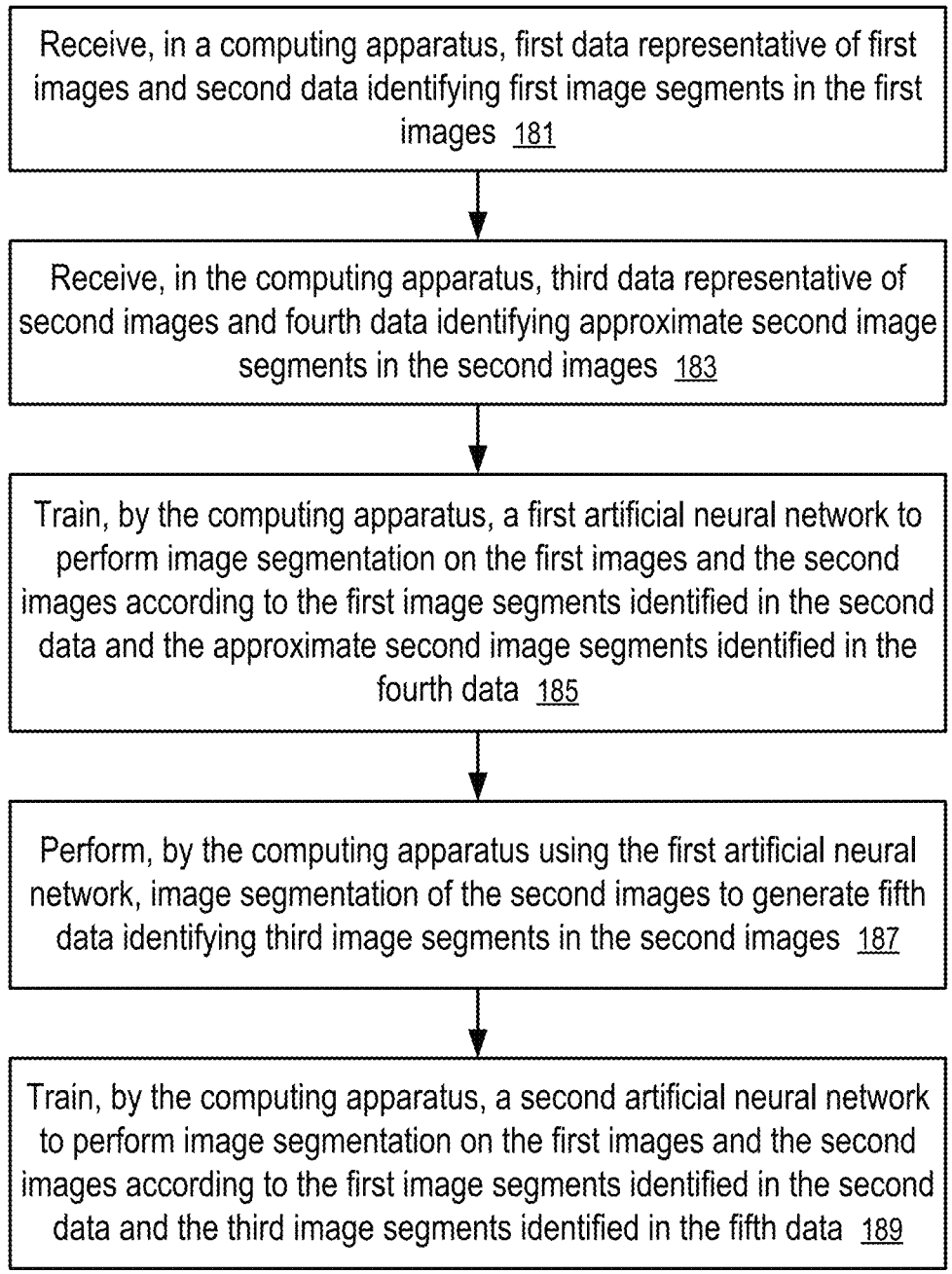
FIG. 5 shows a method of image segmentation via semi supervised training according to one embodiment.

FIG. 5 shows a method of image segmentation via semi supervised training according to one embodiment. For example, the operations of FIG. 5 can be implemented using the techniques of FIGS. 1-3 with coarse labels illustrated in FIG. 4.

At block 181, a computing apparatus receives first data representative of first images 101 and second data identifying first image segments in the first images 101. The first image segments identified in the second data are considered accurate and thus fine labels 103 of image segmentation of the first images 101.

At block 183, the computing apparatus further receives third data representative of second images 102 and fourth data identifying approximate second image segments in the second images 102. The approximate second image segments can have inaccurate information about image segmentation of the second images 102 and thus coarse labels 104.

At block 185, the computing apparatus trains, using a supervised machine learning technique, a first artificial neural network 111 to perform image segmentation on the first images 101 and the second images 102 according to the fine labels 103 of the first image segments identified in the second data and the coarse labels 104 of the approximate second image segments identified in the fourth data.

At block 187, the computing apparatus performs, using the first artificial neural network 111, image segmentation of the second images 102 to generate fifth data identifying third image segments in the second images 102.

For example, the fifth data can be the soft labels 106 in FIG. 1, the modified labels 108 in FIG. 2, or the updated labels 110 in FIG. 3.

For example, the fifth data can be generated by updating the approximate second image segments identified by the fourth data in the second images 102 based on confidence levels of image segments in the second images identified by the first artificial neural network 111.

For example, during the operation of image segmentation of the second images 102, the first artificial neural network 111 classifies each respective pixel in the second images 102 for semantic class and/or object instances and the confidence level of the classification(s). When the confidence level is above a threshold, the classification(s) identified by the first artificial neural network 111 can be accepted as ground true to update the coarse labels 104 and generate the modified labels 108 that is finer than the coarse labels.

Optionally, the confidence levels of pixel classification in image segmentation according to the coarse labels 104 can be estimated based on distances to boundaries of segments and/or distances to interior of segments. Thus, the confidence levels of pixel classification performed by the first artificial neural network 111 can be compared to the confidence levels of corresponding pixels of the coarse labels. The classifications having higher confidence levels can be retained in the modified labels 108.

Optionally, a graphical user interface can be used to present the image segments identified by the first artificial neural network 111 in the second images. The graphical user interface is configured to facilitate the review of the results of image segmentation performed by the first artificial neural network 111. Human inputs 115 can be received in the graphical user interface to accept, reject, modify some of the image segments identified by the first artificial neural network 111. For example, some soft labels 106 can be accepted and promoted as fine labels. For example, soft labels having pixel classifications of lowest confidence levels and/or below a threshold can be selected for prioritized presentation in the graphical user interface for assistance from a human operator for an improved coarse label. Some pixel classifications associated with soft labels 106 having confidence levels below a threshold can be discarded in generated modified labels 108 to be further improvements subsequently after the training of the student artificial neural network 112.

At block 189, the computing apparatus further trains a second artificial neural network 112 to perform image segmentation on the first images 101 and the second images 102 according to the first image segments identified in the second data and the third image segments identified in the fifth data.

For example, the training of the second artificial neural network 112 can be configured to minimize a loss function based on a Wasserstein distance to the third image segments identified in the fifth data; and the loss function can be based on a cross entropy with the third image segments identified in the fifth data for the second images 102. In contrast, the training of the first artificial neural network 111 can be configured to minimize a loss function based on a cross entropy with the second image segments identified in the fourth data for the second images 102.

After the training of the second artificial neural network 112, the computing apparatus can further use the second artificial neural network 112 to perform image segmentation of the second images 102 to generate sixth data identifying fourth image segments in the second images 102, similar to the operations in block 187; and then the computing apparatus further train a third artificial neural network to perform image segmentation on the first images 101 and the second images 102 according to the first image segments identified in the second data and the fourth image segments identified in the sixth data, similar to the operations in block 189. In such a way, the operations in blocks 187 and 189 can be repeated in iterations to improve the soft labels generated by artificial neural networks to improve the coarse labels 104 and improve the performance of the artificial neural networks obtained via the semi supervised training.

Figure 6:
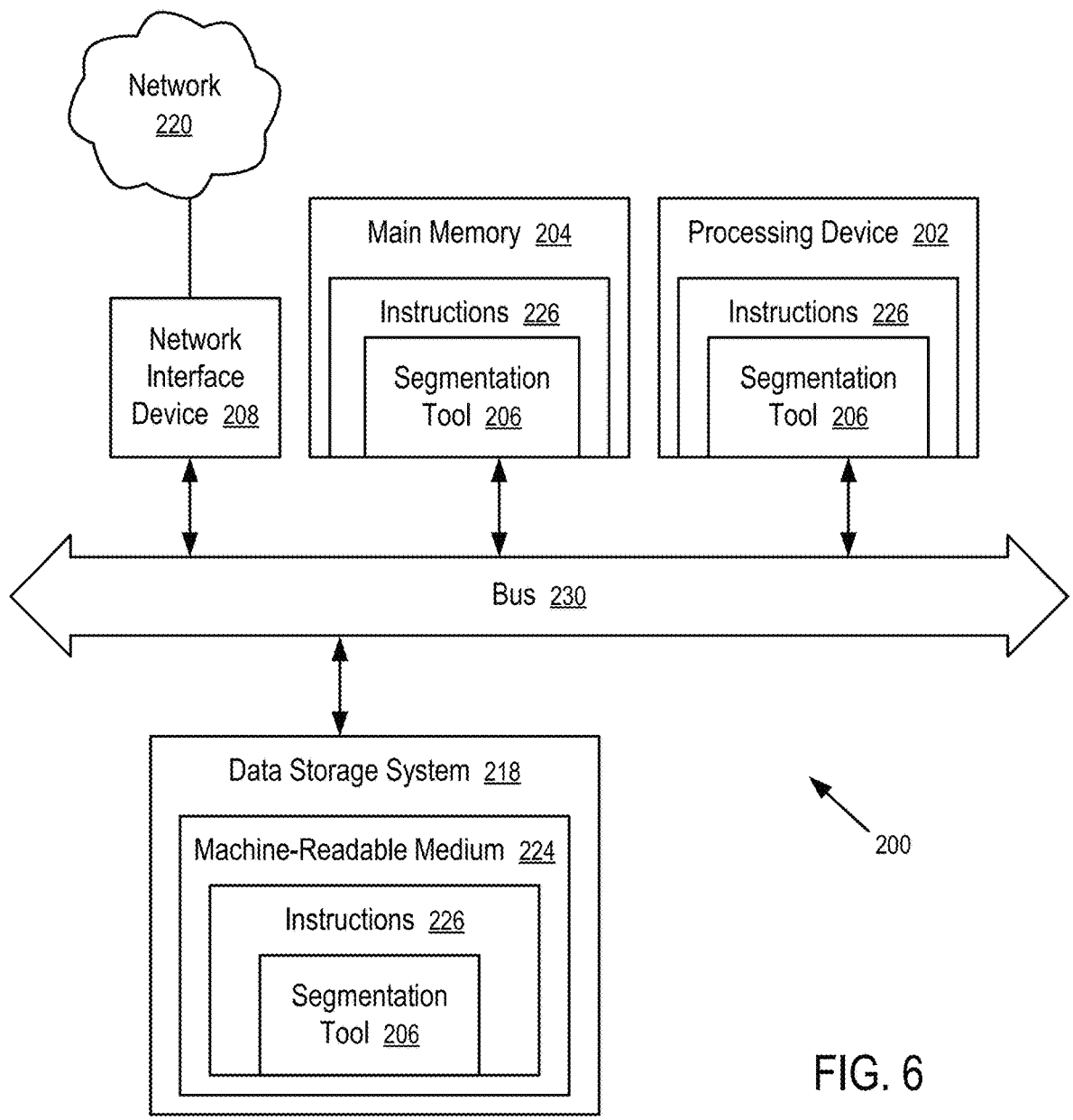
FIG. 6 is a block diagram of an example computer system in which embodiments of the present disclosure can operate.

FIG. 6 illustrates an example machine of a computer system 200 within which a set of instructions, for causing the machine to perform any one or more of the methodologies discussed herein, can be executed. In some embodiments, the computer system 200 can correspond to a host system that includes, is coupled to, or utilizes a memory sub-system or can be used to perform the operations of a segmentation tool 206 (e.g., to execute instructions to perform operations corresponding to semi supervised training described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a server, a personal computer (PC), a tablet PC, a set-top box (STB), a Personal Digital Assistant (PDA), a cellular telephone, a web appliance, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 226 for performing the operations and steps discussed herein. The computer system 200 can further include a network interface device 208 to communicate over the network 220.

The data storage system 218 can include a machine-readable medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable medium 224, data storage system 218, and/or main memory 204 can correspond to a memory sub-system.

In one embodiment, the instructions 226 include instructions to implement functionality corresponding to a segmentation tool 206 (e.g., operations of semi supervised training described with reference to FIGS. 1-5). While the machine-readable medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving, in a computing apparatus, first data representative of first images and second data identifying image segments in the first images;
receiving, in the computing apparatus, third data representative of second images and fourth data identifying approximate image segments in the second images;
training, by the computing apparatus, a first artificial neural network to perform image segmentation on the first images and the second images according to the image segments identified in the second data and the approximate image segments identified in the fourth data;
performing, by the computing apparatus using the first artificial neural network, image segmentation of the second images to generate fifth data identifying image segments in the second images; and
training, by the computing apparatus, a second artificial neural network to perform image segmentation on the first images and the second images according to the image segments identified in the second data and the image segments identified in the fifth data.

2. The method of claim 1, further comprising:
generating the fifth data by updating the approximate image segments identified by the fourth data in the second images based on confidence levels of image segments in the second images identified by the first artificial neural network.

3. The method of claim 2, wherein the updating is based on comparing with a threshold the confidence levels of image segments in the second images identified by the first artificial neural network.

4. The method of claim 2, wherein the updating is based on comparing:
the confidence levels of image segments in the second images identified by the first artificial neural network, and
confidence levels of the approximate image segments identified by the fourth data in the second images.

5. The method of claim 4, further comprising:
determining, by the first artificial neural network, the confidence levels of the image segments in the second images identified by the first artificial neural network; and
estimating, based on distances to boundaries of the approximate image segments, the confidence levels of the approximate image segments identified by the fourth data in the second images.

6. The method of claim 1, further comprising:
presenting, in a graphical user interface, the image segments in the second images identified by the first artificial neural network;
receiving human inputs about the image segments identified by the first artificial neural network; and
generating the fifth data based at least in part on the human inputs and the image segments in the second images identified by the first artificial neural network.

7. The method of claim 6, wherein the human inputs include confirmation of first image segments identified in the second images by the first artificial neural network.

8. The method of claim 7, wherein the human inputs include corrections to second image segments identified in the second images by the first artificial neural network.

9. The method of claim 8, further comprising:
selecting, based on confidence levels in image segmentation results performed by the first artificial neural network, third image segments identified by the first artificial neural network; and
prioritizing presentation of the third image segments in the graphical user interface.

10. The method of claim 1, further comprising:
performing, by the computing apparatus using the second artificial neural network, image segmentation of the second images to generate sixth data identifying image segments in the second images; and
training, by the computing apparatus, a third artificial neural network to perform image segmentation on the first images and the second images according to the image segments identified in the second data and the image segments identified in the sixth data.

11. The method of claim 1, wherein the training of the second artificial neural network is configured to minimize a loss function based on a Wasserstein distance to the image segments identified in the fifth data.

12. The method of claim 11, wherein the training of the second artificial neural network is configured to minimize a loss function based on a cross entropy with the image segments identified in the fifth data for the second images; and the training of the first artificial neural network is configured to minimize a loss function based on a cross entropy with the image segments identified in the fourth data for the second images.

13. An apparatus, comprising:
memory storing instructions; and
at least one processor configured via the instructions to:
train a first artificial neural network to perform image segmentation on first images according to first image segments identified in the first images and to perform image segmentation on second images according to second image segments identified in the second images, wherein the second image segments contain inaccurate information for segmentation of the second images;
perform, using the first artificial neural network, image segmentation of the second images to identify third image segments in the second images; and
train, using a supervised machine learning technique, a second artificial neural network to perform image segmentation on the first images according to the first image segments and to perform image segmentation on the second images according to the third image segments.

14. The apparatus of claim 13, wherein the third image segments replace a first portion of inaccurate segmentation of the second images using segmentation results generated by the first artificial neural network.

15. The apparatus of claim 14, wherein replacement of the portion of inaccurate segmentation is based on confidence levels of classifying a portion of pixels of the second images by the first artificial neural network.

16. The apparatus of claim 15, wherein third image segments further replace a second portion of inaccurate segmentation of the second images based on human inputs provided in reviewing, via a graphical user interface, segmentation results generated by the first artificial neural network.

17. The apparatus of claim 13, wherein at least one processor is configured via the instructions to:
   perform, using the second artificial neural network, image segmentation of the second images to identify fourth image segments in the second images; and
   train, using a supervised machine learning technique, a third artificial neural network to perform image segmentation on the first images according to the first image segments and to perform image segmentation on the second images according to the fourth image segments.

18. A non-transitory computer readable storage medium storing instructions which, when executed by a microprocessor in a computing device, causes the computing device to perform a method, comprising:
   training a first artificial neural network to perform image segmentation on first images according to first image segments identified in the first images and to perform image segmentation on second images according to second image segments identified in the second images, wherein the second image segments contain inaccurate information for segmentation of the second images;
   performing, using the first artificial neural network, image segmentation of the second images to identify third image segments in the second images; and
   training, using a supervised machine learning technique, a second artificial neural network to perform image segmentation on the first images according to the first image segments and to perform image segmentation on the second images according to the third image segments.

19. The non-transitory computer readable storage medium of claim 18, wherein the training of the second artificial neural network is configured to minimize a loss function based on a Wasserstein distance to image regions in the second images where segmentation according to the third image segments is different from the segmentation according to the second image segments.

20. The non-transitory computer readable storage medium of claim 19, wherein the training of the second artificial neural network is further configured to minimize a loss function based on a cross entropy with the third image segments identified for the second images.

* * * * *